United States Patent
Kang et al.

(10) Patent No.: US 11,343,757 B2
(45) Date of Patent: May 24, 2022

(54) METHOD FOR SERVICE PROCESSING AND USER EQUIPMENT

(71) Applicant: VIVO MOBILE COMMUNICATION CO.,LTD., Guangdong (CN)

(72) Inventors: Yanchao Kang, Chang'an Dongguan (CN); Jingzhi Ma, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 76 days.

(21) Appl. No.: 16/764,809

(22) PCT Filed: Nov. 13, 2018

(86) PCT No.: PCT/CN2018/115203
§ 371 (c)(1),
(2) Date: May 15, 2020

(87) PCT Pub. No.: WO2019/096119
PCT Pub. Date: May 23, 2019

(65) Prior Publication Data
US 2020/0367149 A1 Nov. 19, 2020

(30) Foreign Application Priority Data
Nov. 17, 2017 (CN) .......................... 201711147570.3

(51) Int. Cl.
*H04W 4/00* (2018.01)
*H04W 48/16* (2009.01)
(Continued)

(52) U.S. Cl.
CPC ............ *H04W 48/16* (2013.01); *H04L 67/14* (2013.01); *H04W 28/02* (2013.01); *H04W 36/14* (2013.01); *H04W 48/06* (2013.01)

(58) Field of Classification Search
CPC ..... H04W 48/16; H04W 48/06; H04W 28/02; H04W 28/08; H04W 28/16; H04W 24/00;
(Continued)

(56) References Cited

U.S. PATENT DOCUMENTS

2015/0271848 A1 9/2015 Gerasimenko et al.
2017/0094501 A1 3/2017 Huang-Fu
2017/0318619 A1* 11/2017 Kim ....................... H04W 76/15

FOREIGN PATENT DOCUMENTS

CN 102647772 A 8/2012
CN 106031225 A 10/2016
(Continued)

OTHER PUBLICATIONS

'Pseudo-CR on NR-RAN' 3GPP TSG-CT WG1 Meeting #105, Aug. 21, 2017.
(Continued)

Primary Examiner — Temica M Beamer
(74) Attorney, Agent, or Firm — Maschoff Brennan

(57) ABSTRACT

A method for service processing and a user equipment are provided, and the method for service processing includes: starting a back-off timer, after receiving a rejection response message sent by a network side through a 3GPP access; and stopping the back-off timer and triggering a service request process that is based on the 3GPP access, when a non-access stratum notification message sent by the network side through a non-3GPP access is received before the back-off timer expires.

15 Claims, 5 Drawing Sheets

Starting a back-off timer, after receiving a rejection response message sent by a network side through a 3GPP access — 101

Stopping the back-off timer and triggering a service request process that is based on the 3GPP access, when a non-access stratum notification message sent by the network side through a non-3GPP access is received before the back-off timer expires — 102

(51) Int. Cl.
*H04L 67/14* (2022.01)
*H04W 28/02* (2009.01)
*H04W 36/14* (2009.01)
*H04W 48/06* (2009.01)

(58) Field of Classification Search
CPC . H04W 36/14; H04W 36/18; H04W 36/0011; H04W 36/08; H04W 36/22; H04W 16/06; H04W 80/04; H04L 67/14
USPC .......................................... 370/331; 455/453
See application file for complete search history.

(56) References Cited

FOREIGN PATENT DOCUMENTS

| | | |
|---|---|---|
| CN | 107005909 A | 8/2017 |
| CN | 107211482 A | 9/2017 |

OTHER PUBLICATIONS

"Support for Congestion/control" SA WG2 Meeting #1213, Oct. 23, 2017.

CN Office Action in Application No. 201711147570.3 dated Dec. 17, 2019.

\* cited by examiner

METHOD FOR SERVICE PROCESSING AND USER EQUIPMENT

CROSS-REFERENCE TO RELATED APPLICATION

This application is the U.S. national phase of PCT Application No. PCT/CN2018/115203 filed on Nov. 13, 2018, which claims a priority to Chinese Patent Application No. 201711147570.3 filed on Nov. 17, 2017, the disclosures of which are incorporated in their entirety by reference herein.

TECHNICAL FIELD

The present disclosure relates to the field of communication technology, and in particular to a method for service processing and a user equipment.

BACKGROUND

In the related technologies, for a mobile communication terminal (user equipment, UE) registered with a same access mobility management entity or a same public land mobile network (PLMN) through a 3rd generation partnership project (3GPP) access network and a non-3GPP access network, when a network is in a congested state, the network side may notify the UE to start a back-off timer through non-access stratum (NAS) signaling. When congestion of 3GPP access of the network is alleviated and downlink service for the 3GPP access of the UE arrives at the network side, and if the UE is in a connected state in non-3GPP access and is in an idle state in 3GPP access, the network side may send a NAS notification message to the UE via the non-3GPP access. However, due to the existence of the back-off timer of the UE, the UE cannot send a response message to the network side or cannot initiate an activation process of a packet data unit (PDU) session, and cannot trigger a service request process that is based on the 3GPP access. As a result, the UE cannot obtain the downlink service.

In order to enable the UE to obtain the downlink service, it is currently needed that the network side initiates a paging process again in the 3GPP access network to trigger the service request process that is based on the 3GPP access. However, initiating the paging process consumes paging resources on the air interface, resulting in waste of resources.

SUMMARY

In a first aspect, embodiments of the present disclosure provide a method for service processing, applied to a user equipment registered with an access mobility management entity through a 3GPP access network and a non-3GPP access network, including:

starting a back-off timer, after receiving a rejection response message sent by a network side through a 3GPP access; and stopping the back-off timer and triggering a service request process that is based on the 3GPP access, when a non-access stratum notification message sent by the network side through a non-3GPP access is received before the back-off timer expires.

In a second aspect, embodiments of the present disclosure further provide a user equipment, registered with an access mobility management entity through a 3GPP access network and a non-3GPP access network, including:

a starting module, configured to start a back-off timer after receiving a rejection response message sent by a network side through a 3GPP access; and a processing module, configured to stop the back-off timer and trigger a service request process that is based on the 3GPP access, when a non-access stratum notification message sent by the network side through a non-3GPP access is received before the back-off timer expires.

In a third aspect, embodiments of the present disclosure further provide a user equipment, including a memory, a processor, and a computer program stored on the memory and executable by the processor, and when the computer program is implemented by the processor, steps of the method for service processing as described above are implemented.

In a fourth aspect, embodiments of the present disclosure further provide a computer readable storage medium, having a computer program stored thereon, and when the program is executed by a processor, steps of the method for service processing as described above are implemented.

BRIEF DESCRIPTION OF THE DRAWINGS

In order to illustrate technical solutions of embodiments of the present disclosure more clearly, the drawings used in the descriptions of the embodiments of the present disclosure are briefly introduced hereinafter. Apparently, the drawings in the following descriptions are merely some embodiments of the present disclosure. For those skilled in the art, other drawings can be obtained based on these drawings without any creative efforts.

DETAILED DESCRIPTION

In order to illustrate technical solutions of embodiments of the present disclosure more clearly, the drawings used in the descriptions of the embodiments of the present disclosure are briefly introduced hereinafter. Apparently, the drawings in the following descriptions are merely some embodiments of the present disclosure. For those skilled in the art, other drawings can be obtained based on these drawings without any creative efforts.

In the related technologies, for a user equipment registered with a same access mobility management entity through a 3GPP access network and a non-3GPP access network, when receiving a non-access stratum notification message sent through a non-3GPP access, a service request process based on a 3GPP access cannot be triggered due to the existence of a back-off timer, and the service request process based on the 3GPP access needs to be triggered again via the paging process, which causes waste of resources.

Figure 1:
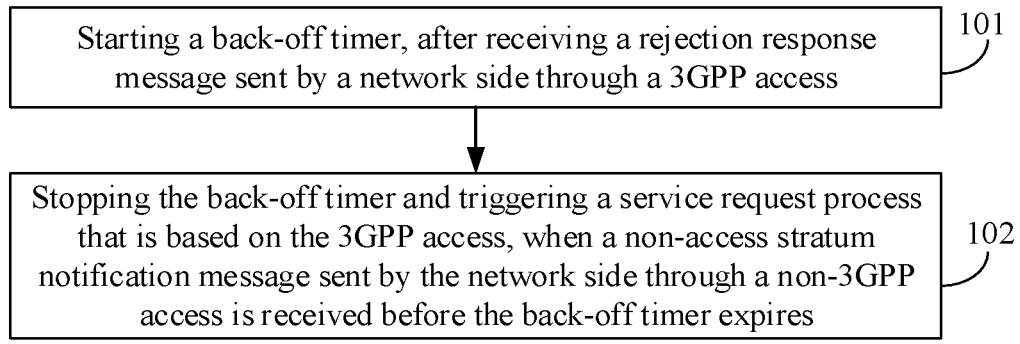
FIG. 1 is a flowchart of a method for service processing according to embodiments of the present disclosure.

Referring to FIG. 1, embodiments of the present disclosure provide a method for service processing, which is applied to a user equipment registered with a same access mobility management entity through a 3GPP access network and a non-3GPP access network. The method includes the steps as follows.

Step 101: starting a back-off timer, after receiving a rejection response message sent by a network side through a 3GPP access.

In specific embodiments of the present disclosure, the rejection response message may be a mobility management request rejection message or a session management request rejection response message. When the rejection response message is the mobility management request rejection message, the corresponding back-off timer is a mobility management back-off timer under the 3GPP access. When the rejection response message is the session management request rejection response message, the corresponding back-off timer is a session management back-off timer under the 3GPP access.

Step 102: stopping the back-off timer and triggering a service request process that is based on the 3GPP access, when a non-access stratum notification message sent by the network side through a non-3GPP access is received before the back-off timer expires.

Further, when the rejection response message is the session management request rejection response message, step 102 may include:

when the user equipment receives the non-access stratum notification message carrying a PDU session identifier through the non-3GPP access network, stopping the session management back-off timer matching the PDU session identifier; and triggering, by the user equipment, the service request process that is based on the 3GPP access. For session management, the session may request access to a data network corresponding to a data network name (DNN), or may request access to a slice corresponding to single network slice selection assistance information (S-NSSAI), or may also request access to a data network corresponding to a DNN under the slice corresponding to the S-NSSAI. Therefore, in specific embodiments of the present disclosure, according to different circumstances, the DNN and/or the S-NSSAI corresponding to the stopped session management back-off timer matching the PDU session identifier and the DNN and/or the S-NSSAI corresponding to the PDU session identifier the same.

In the related technologies, if the user equipment which is in a connected state in the non-3GPP access and is in an idle state in the 3GPP access receives the non-access stratum notification message through the non-3GPP access, the service request process based on the 3GPP access cannot be triggered due to the existence of the back-off timer. As a result, the network side need to trigger, through a paging process again, the user equipment to perform the service request process that is based on the 3GPP access. In the specific embodiments of the present disclosure, for the user equipment registered with the same access mobility management entity through the 3GPP access network and the non-3GPP access network, when it is in a connected state in the non-3GPP access and in an idle state in in the 3GPP access and receives the non-access stratum notification message through the non-3GPP access, and if the previously started back-off timer under the 3GPP access does not expire in this case, the back-off timer under the 3GPP access will be stopped actively, and the service request process based on the 3GPP access will be triggered, so that the user equipment can access the 3GPP network in time and process the downlink service through the 3GPP access, which has at least one of the following beneficial effects:

when the user equipment receives the non-access stratum notification message through the non-3GPP access, it actively stops the back-off timer, and triggers the service request process that is based on the 3GPP access, so that the network side no longer needs to perform paging through the 3GPP access, saving radio resources of air interface;

when the user equipment receives the non-access stratum notification message through the non-3GPP access, it can actively stop the back-off timer under the 3GPP access, and promptly trigger the service request process that is based on the 3GPP access in response to the non-access stratum notification message, improving the utilization rate of non-access stratum notification message; and when the user equipment receives the non-access stratum notification message through the non-3GPP access, it can actively stop the back-off timer under the 3GPP access, and promptly trigger the service request process that is based on the 3GPP access; since a time delay for the user equipment to respond to the non-access stratum notification message under the non-3GPP access is much smaller than a time delay for the user equipment to listen to and respond to a paging under the 3GPP access, the service response speed is improved; in addition, due to the reduction in time delay, the success rate of establishment of downlink service in congestion recovery scenario is increased accordingly.

Specific implementations of the method for service processing according to the embodiments of the present disclosure will be described in detail hereinafter with reference to different scenarios and FIGS. 1 to 4.

Figure 2:
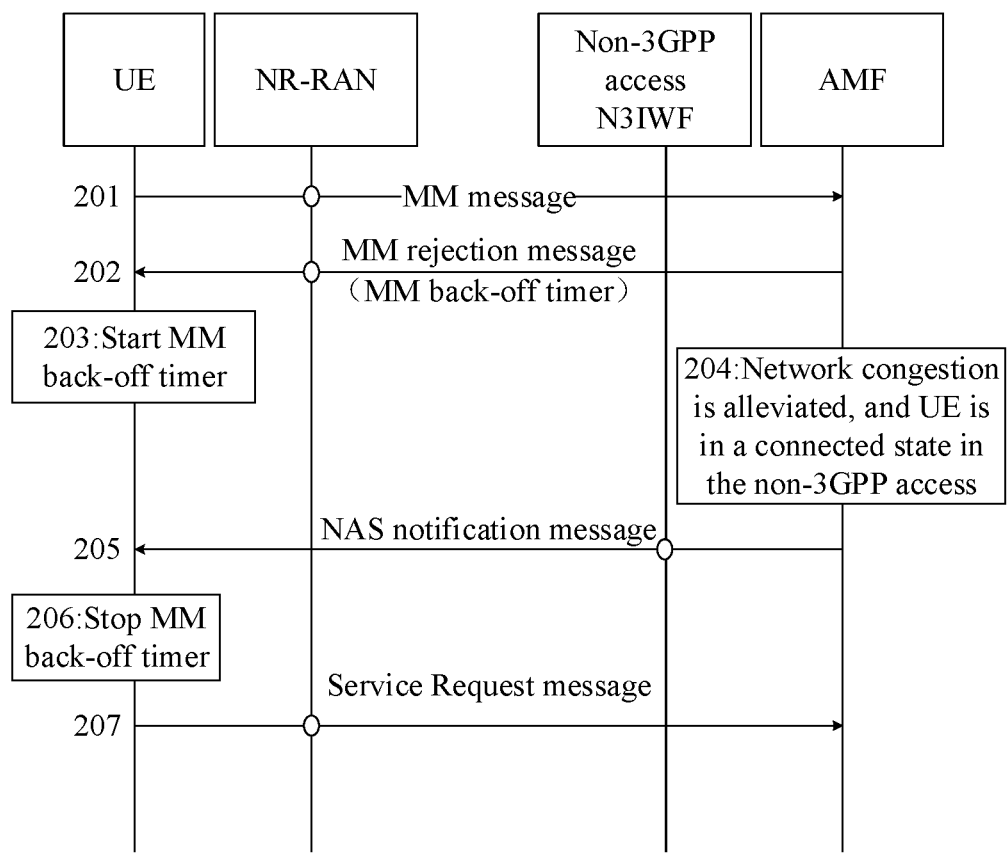
FIG. 2 is a flowchart of a method for service processing according to examples of the present disclosure.

Reference is made to FIG. 2, which is a detailed flowchart of a method for service processing according to a first example of the present disclosure when it is applied to mobility management. The method for service processing includes the steps as follows.

Step 201: the UE sends a mobility management (MM) message to a mobility management entity (access and mobility management function, AMF), via the 3GPP access, new radio-radio access network (NR-RAN);

the MM message may be a registration request message (Registration Request) or a service request message (Service Request), where the registration request message may be an initial registration request message, or a periodic mobile registration update request message (Periodic and Mobility Registration Update Request);

Step 202: when the AMF rejects the request of the UE due to network congestion, the MM request rejection message is returned to the UE through the NR-RAN, and the duration of the mobility management back-off timer is provided in the MM request rejection message;

Step 203: after receiving the MM request rejection message, the UE starts the mobility management back-off timer;

Step 204: after a period of time, the network congestion is alleviated, and the UE is in a connected state in the non-3GPP access;

Step 205: when the AMF finds that the UE has downlink data arriving, as the UE is in the connected state in the non-3GPP access, the NAS notification message is sent to the UE through the non-3GPP access, N3IWF;

Step 206: when the UE receives the NAS notification message through the N3IWF, it is determined that the congestion of the network side is alleviated, and the previously started mobility management back-off timer is stopped;

Step 207: the UE sends a service request message (Service Request) to the AMF through the 3GPP access.

The first example as described above is a service processing procedure where the present disclosure is applied to mobility management. In addition to the mobility management, the service processing procedure of the embodiments of the present disclosure may also be applied to session management. For details, reference can be made to a second example to a fourth example.

Figure 3:
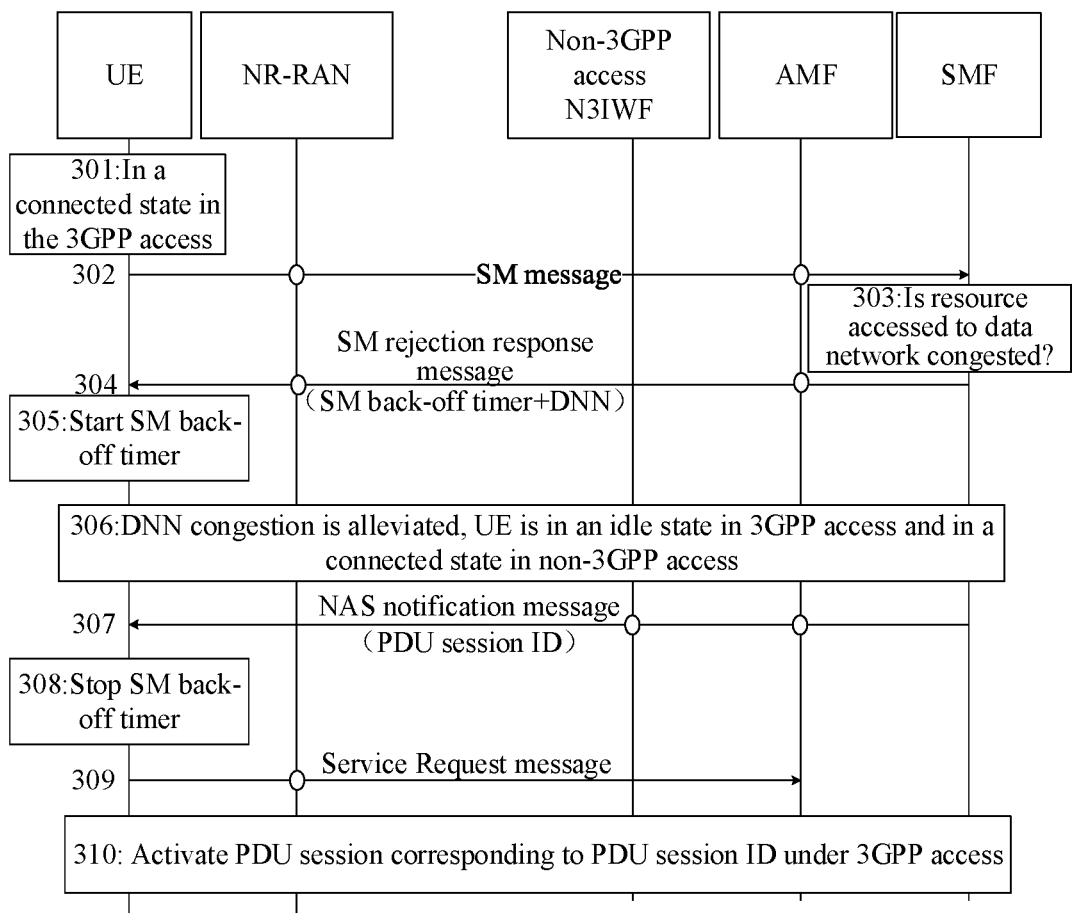
FIG. 3 is a flowchart of a method for service processing according to examples of the present disclosure.

Reference is made to FIG. 3, which is a detailed schematic flowchart of a method for service processing according to a second example of the present disclosure when it is applied to session management. The method for service processing includes the steps as follows.

Step 301: the UE is in a connected state in the 3GPP access;

Step 302: the UE sends a mobility management message (N1 SM message) to the AMF through the 3GPP access, NR-RAN, and the AMF forwards the N1 SM message to the session management function (SMF) entity;

the SM message may be a session establishment request message (PDU Session Establishment Request message) or a session modification request message (PDU Session Modification Request message), which may carry a DNN.

Step 303: after receiving the SM message, the SMF determines whether the resource accessed to the data network corresponding to the DNN is in a congested state;

Step 304: when the resource accessed to the data network corresponding to the DNN is in the congested state, the SMF rejects the request of the UE, returns an SM rejection response message to the UE through the AMF and the NR-RAN, and provides in the SM rejection message the duration of the session management back-off timer and the DNN congestion indication information for indicating that the resource accessed to the data network corresponding to the DNN is congested;

Step 305: after receiving the SM rejection response message, the UE starts the session management back-off timer corresponding to the DNN;

Step 306: after a period of time, when the DNN network congestion is alleviated, the UE is in an idle state in the 3GPP access and is in a connected state in the non-3GPP access;

Step 307: when the network side finds that the UE needs to activate a certain session, as the UE is in the connected state in the non-3GPP access, the SMF will send the NAS notification message to the UE through the AMF and the non-3GPP access, N3IWF; the NAS notification message carries a PDU session ID;

Step 308: when the UE receives the NAS notification message through the N3IWF, it is determined that the network side congestion is alleviated, and it is determined whether there is a corresponding session management back-off timer corresponding to the DNN corresponding to the PDU session ID carried in the NAS notification message; and if there exists, the corresponding session management back-off timer will be stopped;

Step 309: the UE sends a service request message (Service Request) to the AMF through the 3GPP access, NR-RAN;

Step 310: the UE and the network side activate the PDU session corresponding to the PDU session ID under the 3GPP access.

In the second example described above, the SM message carries the DNN. In addition, the SM message may carry S-NSSAI. For details, reference can be made to the third example.

Figure 4:
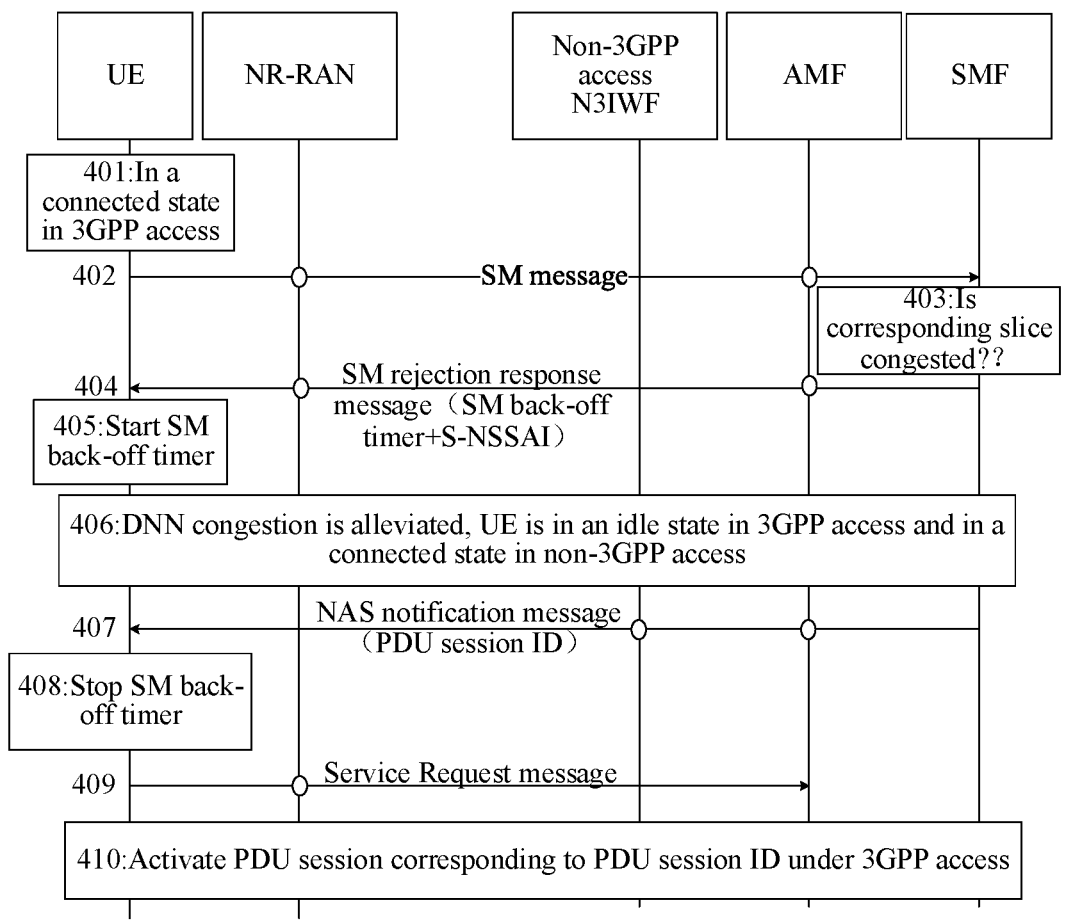
FIG. 4 is a flowchart of a method for service processing according to examples of the present disclosure.

Reference is made to FIG. 4, which is a detailed schematic flowchart of a method for service processing according to the third example of the present disclosure when it is applied to session management. The method for service processing includes the steps as follows.

Step 401: the UE is in a connected state in the 3GPP access;

Step 402: the UE sends a mobility management message (N1 SM message) to the AMF through the 3GPP access, NR-RAN, and the AMF forwards the N1 SM message to the SMF entity;

the SM message may be a session establishment request message (PDU Session Establishment Request message) or a session modification request message (PDU Session Modification Request message), which may carry S-NSSAI.

Step 403: after receiving the SM message, the SMF determines whether the network slice corresponding to the S-NSSAI is in a congested state;

Step 404: when the corresponding network slice is in the congested state, the SMF rejects the request of the UE, returns an SM rejection response message to the UE through the SMF and NR-RAN, and provides in the SM rejection message the duration of the session management back-off timer and congestion indication information for indicating that the network slice corresponding to S-NSSAI is congested;

Step 405: after receiving the SM rejection response message, the UE starts the session management back-off timer corresponding to the S-NSSAI;

Step 406: after a period of time, when the congestion of the network slice corresponding to the S-NSSAI in the network is alleviated, the UE is in an idle state in the 3GPP access and is in a connected state in the non-3GPP access;

Step 407: when the network side finds that the UE needs to activate a certain session, as the UE is in the connected state in the non-3GPP access, the SMF sends a NAS notification message to the UE through the AMF and the non-3GPP access, N3IWF; the NAS notification message carries a PDU session ID;

Step 408: when the UE receives the NAS notification message through the N3IWF, it is determined that the network side congestion is alleviated, and it is determined whether there is a corresponding session management back-off timer corresponding to the S-NSSAI corresponding to the PDU session ID carried in the NAS notification message; and if there exists, the corresponding session management back-off timer will be stopped;

Step 409: the UE sends a service request message (Service Request) to the AMF through the 3GPP access, NR-RAN;

Step 410: the UE and the network side activate the PDU session corresponding to the PDU session ID under the 3GPP access.

In the third example described above, the SM message carries the DNN or the S-NSSAI. In addition, the SM message may carry the DNN and the S-NSSAI. For details, reference can be made to the fourth example.

Figure 5:
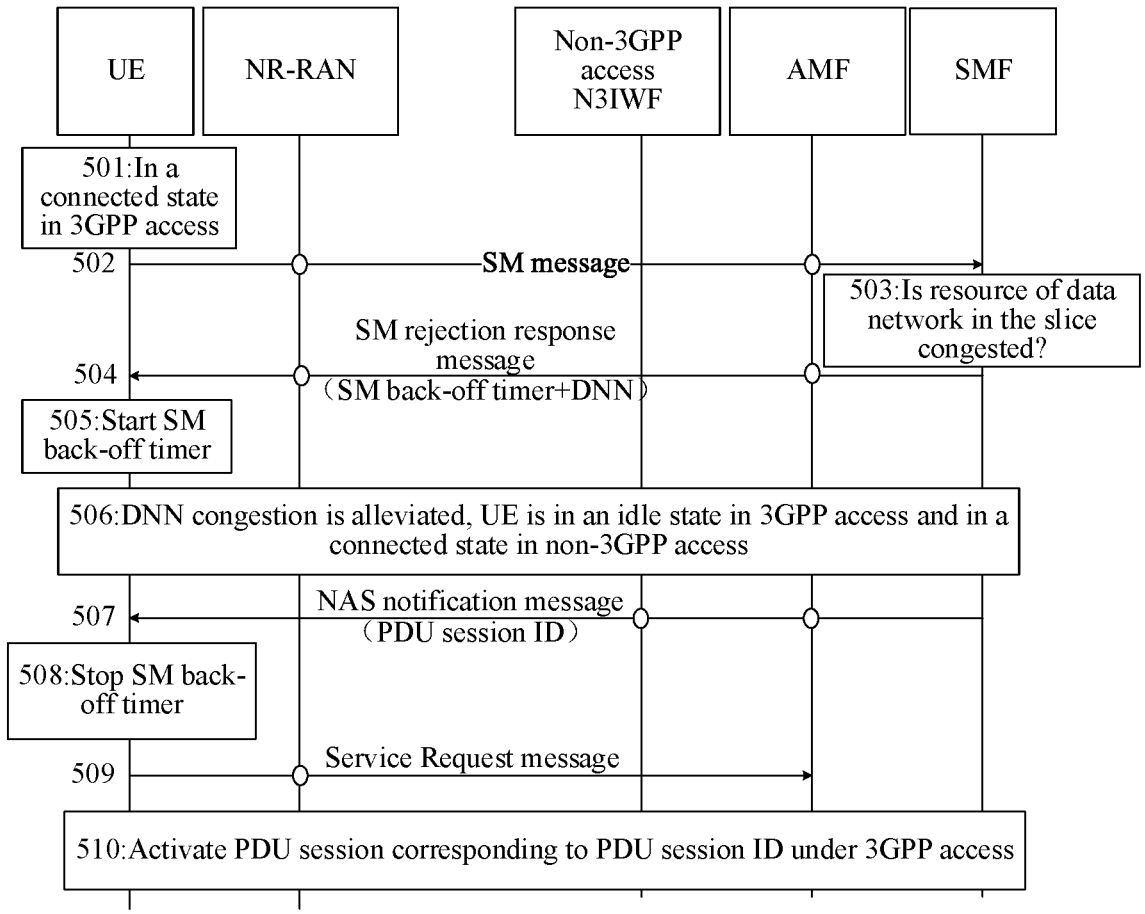
FIG. 5 is a flowchart of a method for service processing according to examples of the present disclosure.

Reference is made to FIG. 5, which is a detailed schematic flowchart of a method for service processing according to the fourth example of the present disclosure when it is applied to session management. The method for service processing includes the steps as follows.

Step 501: the UE is in the connected state in the 3GPP access;

Step 502: the UE sends a mobility management message (N1 session management (SM) message) to the AMF through the 3GPP access, NR-RAN, and the AMF forwards the N1 SM message to the SMF entity;

the SM message may be a session establishment request message (PDU Session Establishment Request message) or a session modification request message (PDU Session Modification Request message), which may carry DNN and S-NSSAI;

Step 503: after receiving the SM message, the SMF determines whether the resource of the data network corresponding to the DNN in the slice corresponding to the S-NSSAI is in a congested state;

Step 504: when the resource of the data network corresponding to the DNN in the slice corresponding to the S-NSSAI is in the congested state, the SMF rejects the request of the UE, returns an SM rejection response message to the UE through the SMF and NR-RAN, and provides in the SM rejection message the duration of the session management back-off timer and congestion indication information for indicating that the resource of the data network corresponding to the DNN in the slice corresponding to the S-NSSAI is congested;

Step 505: after receiving the SM rejection response message, the UE starts the session management back-off timer corresponding to the DNN and the S-NSSAI;

Step 506: after a period of time, when the resource congestion is alleviated, the UE is in an idle state in the 3GPP access and is in a connected state in the non-3GPP access;

Step 507: when the network side finds that the UE needs to activate a certain session, as the UE is in the connected state in the non-3GPP access, the SMF will send a NAS notification message to the UE through the AMF and the non-3GPP access, N3IWF; the NAS notification message carries the PDU session ID under the 3GPP access that is expected to be activated;

Step 508: when receiving the NAS notification message through the N3IWF, the UE determines that the network side congestion is alleviated, and determines whether there is a corresponding session management back-off timer corresponding to the S-NSSAI and DNN corresponding to the PDU session ID carried in the NAS notification message; and if there exists, it will stop the corresponding session management back-off timer;

Step 509: the UE sends a service request message (Service Request) to the AMF through the 3GPP access, NR-RAN;

Step 510: the UE and the network side activate the PDU session corresponding to the PDU session ID under the 3GPP access.

It can be known from the above examples that, with the method according to the embodiments of the present disclosure, there is no need to waste the signaling, and the downlink service establishment delay, caused by the NAS notification process of the non-3GPP access, which reduces the delay of the UE to respond to the network in the congestion recovery scenario, and thus the success probability of establishing downlink service in the congestion recovery scenario is improved.

The above embodiments describe the method for service processing of the present disclosure. The user equipment corresponding to the method for service processing of the present disclosure will be described hereinafter with reference to the embodiments and the drawings.

Figure 6:
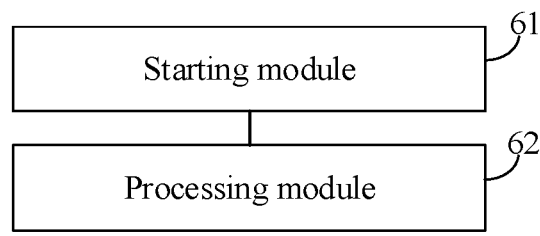
FIG. 6 is a first schematic structural diagram of a user equipment according to embodiments of the present disclosure.

Referring to FIG. 6, embodiments of the present disclosure also provide a user equipment that is registered with a same access mobility management entity through a 3GPP access network and a non-3GPP access network. The user equipment includes a starting module 61 and a processing module 62.

The starting module 61 is configured to start a back-off timer after receiving a rejection response message sent by a network side through a 3GPP access.

The processing module 62 is configured to stop the back-off timer and trigger a service request process that is based on the 3GPP access, when a non-access stratum notification message sent by the network side through a non-3GPP access is received before the back-off timer expires.

The user equipment of the embodiments of the present disclosure actively stops the back-off timer actively when receiving the non-access stratum notification message through the non-3GPP access, and triggers the service request process that is based on the 3GPP access, so that the network side no longer needs to perform paging through the 3GPP access, saving radio resources of air interface.

Optionally, the rejection response message is a mobility management request rejection message, and the back-off timer is a mobility management back-off timer.

Optionally, the rejection response message is a session management request rejection response message, and the back-off timer is a session management back-off timer.

Figure 7:
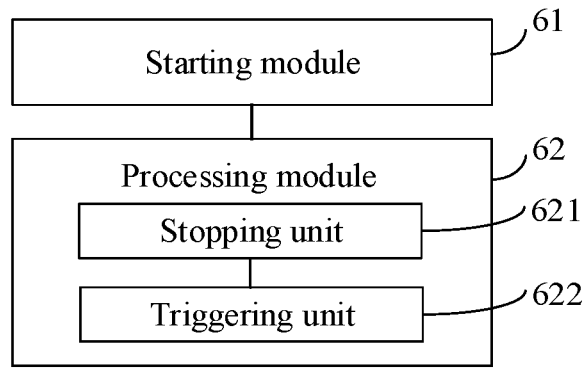
FIG. 7 is a second schematic structural diagram of a user equipment according to embodiments of the present disclosure.

Optionally, referring to FIG. 7, the processing module 62 includes:

a stopping unit 621, configured to stop, when the non-access stratum notification message carrying a packet data unit (PDU) session identifier is received through the non-3GPP access network, the session management back-off timer matching the PDU session identifier; and a triggering unit 622, configured to trigger the service request process.

Optionally, a DNN and/or S-NSSAI corresponding to the stopped session management back-off timer is the same as a DNN and/or S-NSSAI corresponding to the PDU session identifier.

Embodiment of the present disclosure also provide a user equipment, including a processor, a memory, and a computer program stored on the memory and executable by the processor, wherein, when the computer program is executed by the processor, various processes of the embodiments of the method for service processing are implemented, and the same technical effects can be achieved, which are not repeated herein to avoid repetition.

Figure 8:
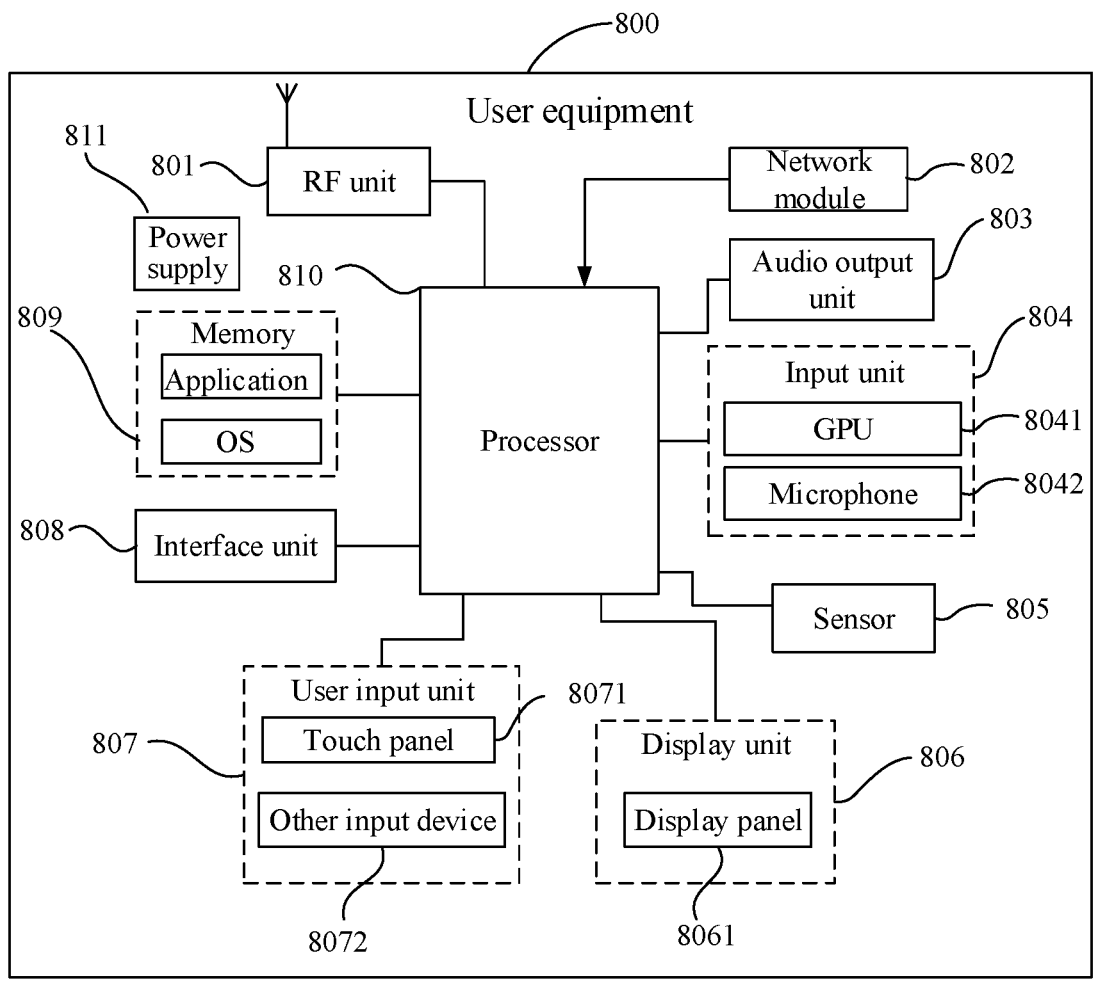
FIG. 8 is a third schematic structural diagram of a user equipment according to embodiments of the present disclosure.

Specifically, FIG. 8 is a schematic diagram of a hardware structure of a user equipment for implementing various embodiments of the present disclosure. The user equipment 800 includes, but is not limited to, a radio frequency unit 801, a network module 802, an audio output unit 803, an input unit 804, a sensor 805, a display unit 806, a user input unit 807, an interface unit 808, a memory 809, a processor 810, and a power supply 811, etc. Those skilled in the art can understand that the structure of the user equipment shown in FIG. 8 does not constitute a limitation to the user equipment, and the user equipment may include more or fewer components than those shown in the figure, or have some components combined, or use a different arrangement of the components. In the embodiments of the present disclosure, the user equipment includes, but is not limited to, a mobile phone, a tablet computer, a notebook computer, a palmtop computer, a vehicle-mounted terminal, a wearable device, a pedometer, or the like.

In the embodiments of the present disclosure, the user equipment 800 is registered with the same access mobility management entity through the 3GPP access network and the non-3GPP access network.

The radio frequency unit 801 is configured to receive a rejection response message sent by the network side through the 3GPP access, and receive a non-access stratum notification message sent by the network side through the non-3GPP access;

The processor 810 is configured to start a back-off timer after receiving the rejection response message sent by the network side through the 3GPP access; and stop the back-off timer and trigger a service request process that is based on the 3GPP access, when the non-access stratum notification message sent by the network side through the non-3GPP access is received before the back-off timer expires.

The user equipment 800 of the embodiments of the present disclosure actively stops the back-off timer when receiving the non-access stratum notification message through the non-3GPP access, and triggers the service request process that is based on the 3GPP access, so that the network side no longer needs to perform paging through the 3GPP access, saving radio resources of air interface; when the non-access stratum notification message is received through non-3GPP access, it can actively stop the back-off timer under the 3GPP access, and promptly trigger the service request process that is based on the 3GPP access in response to the non-access stratum notification message, improving the utilization rate of non-access stratum notification message; when the non-access stratum notification message is received through the non-3GPP access, it can actively stop the back-off timer under the 3GPP access, and promptly trigger the service request process that is based on the 3GPP access; since a time delay for the user equipment to respond to the non-access stratum notification message under the non-3GPP access is much smaller than a time delay for the user equipment to listen to and respond to a paging under the 3GPP access, the service response speed is improved; in addition, due to the reduction in time delay, the success rate of establishment of downlink service in congestion recovery scenario is increased accordingly.

It should be understood that, in the embodiments of the present disclosure, the radio frequency unit 801 may be configured to receive and send information, or to receive and send signals in a call. Specifically, the radio frequency unit 801 delivers the downlink data received from a base station to the processor 810; and transmits the uplink data to the base station. Generally, the radio frequency unit 801 includes, but is not limited to, an antenna, at least one amplifier, a transceiver, a coupler, a low noise amplifier, a duplexer, or the like. In addition, the radio frequency unit 801 may communicate with a network or other devices via a wireless communication system.

The user equipment provides users with wireless broadband Internet access via the network module 802, such as helping users send and receive emails, browse web pages and access streaming media.

The audio output unit 803 may convert audio data received by the radio frequency unit 801 or the network module 802 or stored in the memory 809 into audio signals and output them as sound. Moreover, the audio output unit 803 may provide audio output (for example, call signal reception sound, message reception sound, etc.) related to a specific function performed by the user equipment 800. The audio output unit 803 includes a speaker, a buzzer, a receiver, or the like.

The input unit 804 is configured to receive audio or video signals. The input unit 804 may include a graphics processing unit (GPU) 8041 and a microphone 8042. The graphics processor 8041 is configured to process image data of still pictures or videos obtained via an image capture device (such as a camera) in an image capture mode or a video capture mode. The processed image frames may be displayed on the display unit 806. The image frames processed by the graphics processor 8041 may be stored in the memory 809 (or other storage medium) or transmitted via the radio frequency unit 801 or the network module 802. The microphone 8042 may receive sound, and may process the sound into audio data. The processed audio data may be converted into a format that can be transmitted to a mobile communication base station for outputting via the radio frequency unit 801 in the case of a telephone call mode.

The user equipment 800 further includes at least one sensor 805, such as an optical sensor, a motion sensor, or other sensors. Specifically, the optical sensor includes an ambient light sensor and a proximity sensor. The ambient light sensor may adjust brightness of the display panel 8061 according to the brightness of the ambient light, and the proximity sensor may close the display panel 8061 and/or backlight when the user equipment 800 approaches to the ear. As a type of motion sensor, an accelerometer sensor may detect the magnitude of acceleration in various directions (usually three-axis directions), and detect the magnitude and direction of gravity when in the stationary state. The accelerometer sensor may be applied to identify the pose of the user equipment (such as switching of horizontal and vertical screen, a correlated game, magnetometer pose calibration), a function about vibration recognition (such as pedometer, tapping). The sensor 805 may also include a fingerprint sensor, a pressure sensor, an iris sensor, a molecular sensor, a gyroscope, a barometer, a hygrometer, a thermometer, an infrared sensor, or the like, which are not described herein.

The display unit 806 is configured to display information input by the user or information provided for the user. The display unit 806 may include a display panel 8061. The display panel 8061 may be configured in the form of a liquid crystal display (LCD), an organic light-emitting diode (OLED), or the like.

The user input unit 807 may be configured to receive inputted numeric or character information, and generate key signal inputs related to user settings and function control of the user equipment. Specifically, the user input unit 807 includes a touch panel 8071 and other input device 8072. The touch panel 8071, also known as a touch screen, may collect a touch operation of a user thereon or thereby (for example, an operation on or around the touch panel 8071 that is made by a user with a finger, a touch pen or any other suitable object or accessory). The touch panel 8071 may include two parts: a touch detection device and a touch controller. The touch detection device detects touch orientation of the user, detects a signal caused by the touch operation, and transmits the signal to the touch controller. The touch controller receives touch information from the touch detection device, converts the touch information into contact coordinates, and transmits the contact coordinates to the processor 810. The touch controller may receive a command from the processor 810 and executes the command. In addition, the touch panel 8071 may be implemented by various types such as a resistive panel, a capacitive panel, an infrared panel, or a surface acoustic wave panel. In addition to the touch panel 8071, the user input unit 807 may include other input device 8072. Specifically, the other input device 8072 may include, but is not limited to, a physical keyboard, a function key (such as a volume control key, a switch key), a trackball, a mouse, or a joystick, which are not described herein.

Further, the display panel 8061 may be covered by the touch panel 8071. When the touch panel 8071 detects a touch operation on or near the touch panel 8071, the touch panel 8071 transmits the touch operation to the processor 810 to determine the type of the touch event, and the processor 810 provides a corresponding visual output on the display panel 8061 according to the type of touch event. Although the touch panel 8071 and the display panel 8061 are implemented as two independent components to implement the input and output functions of the user equipment in FIG. 8, in some embodiments, the touch panel 8071 and the display panel 8061 may be integrated to implement the input and output functions of the user equipment, which are not limited herein.

The interface unit 808 is an interface through which an external device is connected to the user equipment 800. For example, the external device may include a wired or wireless headset port, an external power (or battery charger) port, a wired or wireless data port, a memory card port, a port for connecting a device with an identity module, an audio input/output (I/O) port, a video I/O port, a headphone port, etc. The interface unit 808 may be configured to receive input (e.g., data information, power, etc.) from an external device and transmit the received input to one or more elements in the user equipment 800 or may be configured to transmit data between the user equipment 800 and the external device.

The memory 809 may be configured to store software programs and various data. The memory 809 may mainly include a program storage area and a data storage area, where the program storage area may store an operating system, an application (such as a sound playback function, an image playback function, etc.) required for at least one function; the data storage area may store data (such as audio data, a phone book, etc.) created according to the use of the mobile phone. In addition, the memory 809 may include a high-speed random access memory, and may further include a non-volatile memory, such as at least one magnetic disk storage device, a flash memory device, or other volatile solid-state storage device.

The processor 810 is a control center of the user equipment, which uses various interfaces and lines to connect various parts of the entire user equipment. The processor 810 runs or executes software programs and/or modules stored in the memory 809 and calls data stored in the memory 809, to execute various functions of the user equipment and process data, so as to monitor the user equipment as a whole. The processor 810 may include one or more processing units. Optionally, the processor 810 may integrate an application processor and a modem processor. The application processor mainly processes an operating system, a user interface, an application, etc., and the modem processor mainly processes wireless communications. It can be understood that the foregoing modem processor may not be integrated into the processor 810.

The user equipment 800 may further include a power supply 811 (such as a battery) for supplying power to various components. Optionally, the power supply 811 may be logically connected to the processor 810 through a power management system, so as to implement functions, such as management of charging and discharging, and power consumption management, via the power management system.

In addition, the user equipment 800 may include some functional modules that are not shown, which are not described herein again.

Embodiments of the present disclosure further provide a computer readable storage medium. A computer program is stored on the computer readable storage medium. When the computer program is executed by a processor, the various processes of the embodiments of the above method are implemented, which can achieve the same technical effects. To avoid repetition, details are not described herein. The computer readable storage medium is, for example, a read-only memory (ROM), a random access memory (RAM), a magnetic disk or an optical disk It should be noted that, in the present disclosure, the terms "include", "have" or any other variants thereof are meant to cover non-exclusive inclusion, so that a process, method, item or apparatus including a series of elements is not limited to those elements, and optionally includes other elements that are not specifically listed or that are inherent in the process, method, item or apparatus. With no other limitations, an element restricted by the phrase "include a . . . " does not exclude the existence of other identical elements in the process, method, item or apparatus including the element.

Through the descriptions of the above embodiments, those skilled in the art can clearly understand that the methods in the above embodiments can be implemented by means of software plus a necessary universal hardware platform, and also may be implemented by hardware, but in many cases the former is preferred. Based on this understanding, the technical solution of the present disclosure that is essentially or contributes to the related technologies can be embodied in the form of a software product that is stored in a storage medium (such as a ROM/RAM, a magnetic disk, or an optical disc), which includes several instructions for enabling a terminal (which may be a mobile phone, a computer, a server, an air conditioner, or a network device) to execute the method described in the embodiments of the present disclosure.

The embodiments of the present disclosure are described in the above with reference to the drawings, and the present disclosure is not limited to the above specific implementations. The above specific implementations are illustrative rather than restrictive. Various forms can be made by those of ordinary skill in the art under the inspiration of the present disclosure, without departing from the purpose of the present disclosure and the protection scope of the claims, all of which fall within the protection of the present disclosure.

What is claimed is:

1. A method for service processing, applied to a user equipment registered with an access mobility management entity through a 3 GPP access network and a non-3 GPP access network, comprising:
   starting a back-off timer, after receiving a rejection response message sent by a network side through a 3GPP access; and
   stopping the back-off timer and triggering a service request process that is based on the 3GPP access, when a non-access stratum notification message sent by the network side through a non-3GPP access is received before the back-off timer expires.

2. The method for service processing according to claim 1, wherein the rejection response message is a mobility management request rejection message, and the back-off timer is a mobility management back-off timer.

3. The method for service processing according to claim 1, wherein the rejection response message is a session management request rejection response message, and the back-off timer is a session management back-off timer.

4. The method for service processing according to claim 3, wherein, the stopping the back-off timer and triggering the service request process that is based on the 3GPP access when the non-access stratum notification message sent by the network side through the non-3GPP access is received before the back-off timer expires, comprises:
   stopping, when the non-access stratum notification message carrying a packet data unit (PDU) session identifier is received through the non-3GPP access network, the session management back-off timer matching the PDU session identifier; and
   triggering the service request process.

5. The method for service processing according to claim 4, wherein a data network name (DNN) and/or single network slice selection assistance information (S-NSSAI) corresponding to the stopped session management back-off timer is the same as a DNN and/or S-NSSAI corresponding to the PDU session identifier.

6. A user equipment, registered with an access mobility management entity through a 3GPP access network and a non-3GPP access network, comprising a memory, a processor, and a program stored on the memory and executable by the processor, wherein the processor is configured to execute the program to:
   start a back-off timer after receiving a rejection response message sent by a network side through a 3GPP access; and
   stop the back-off timer and trigger a service request process that is based on the 3GPP access, when a non-access stratum notification message sent by the network side through a non-3GPP access is received before the back-off timer expires.

7. The user equipment according to claim 6, wherein the rejection response message is a mobility management request rejection message, and the back-off timer is a mobility management back-off timer.

8. The user equipment according to claim 6, wherein the rejection response message is a session management request rejection response message, and the back-off timer is a session management back-off timer.

9. The user equipment according to claim 8, wherein the processor is configured to:
   stop, when the non-access stratum notification message carrying a packet data unit (PDU) session identifier is received through the non-3GPP access network, the session management back-off timer matching the PDU session identifier; and
   trigger the service request process.

10. The user equipment according to claim 9, wherein a data network name (DNN) and/or single network slice selection assistance information (S-NSSAI) corresponding to the stopped session management back-off timer is the same as a DNN and/or S-NSSAI corresponding to the PDU session identifier.

11. A non-transitory computer readable storage medium, having a program stored thereon, wherein, when the program is executed by a processor, the following steps are implemented:
   starting a back-off timer, after receiving a rejection response message sent by a network side through a 3GPP access; and
   stopping the back-off timer and triggering a service request process that is based on the 3GPP access, when a non-access stratum notification message sent by the network side through a non-3GPP access is received before the back-off timer expires.

12. The non-transitory computer readable storage medium according to claim 11, wherein the rejection response message is a mobility management request rejection message, and the back-off timer is a mobility management back-off timer.

13. The non-transitory computer readable storage medium according to claim 11, wherein the rejection response message is a session management request rejection response message, and the back-off timer is a session management back-off timer.

14. The non-transitory computer readable storage medium according to claim 13, wherein, the stopping the back-off timer and triggering the service request process that is based on the 3GPP access when the non-access stratum notification message sent by the network side through the non-3GPP access is received before the back-off timer expires, comprises:
   stopping, when the non-access stratum notification message carrying a packet data unit (PDU) session identifier is received through the non-3GPP access network, the session management back-off timer matching the PDU session identifier; and
   triggering the service request process.

15. The non-transitory computer readable storage medium according to claim 14, wherein a data network name (DNN) and/or single network slice selection assistance information (S-NSSAI) corresponding to the stopped session management back-off timer is the same as a DNN and/or S-NSSAI corresponding to the PDU session identifier.

* * * * *